(12) United States Patent
Elpers et al.

(10) Patent No.: US 11,174,926 B2
(45) Date of Patent: Nov. 16, 2021

(54) VEHICLE TRANSMISSION

(71) Applicant: Deere and Company, Moline, IL (US)

(72) Inventors: Curt A. Elpers, Coal Valley, IL (US); Nicholas R. Borkgren, Cambridge, IL (US)

(73) Assignee: Deere & Company, Moline, IL (US)

( * ) Notice: Subject to any disclaimer, the term of this patent is extended or adjusted under 35 U.S.C. 154(b) by 218 days.

(21) Appl. No.: 16/205,173

(22) Filed: Nov. 29, 2018

(65) Prior Publication Data

US 2020/0173528 A1    Jun. 4, 2020

(51) Int. Cl.
*F16H 37/08* (2006.01)
*F16H 48/08* (2006.01)
*A01D 41/02* (2006.01)
*A01D 69/06* (2006.01)

(52) U.S. Cl.
CPC ......... *F16H 37/0806* (2013.01); *A01D 41/02* (2013.01); *A01D 69/06* (2013.01); *F16H 48/08* (2013.01)

(58) Field of Classification Search
CPC .............. F16D 48/062; F16H 61/0204; F16H 61/0403; F16H 2500/1045; F16H 2500/30803; F16H 2500/30816; F16H 2500/30822; F16H 2500/30825; F16H 2500/3144; F16H 2500/50653; F16H 2500/70426; F16H 2500/7048; F16H 59/14; F16H 59/40; F16H 59/72; F16H 2200/0065; F16H 2200/2012; F16H 2200/2041; F16H 2200/2046; F16H 2200/2064; F16H 2200/2094; F16H 37/0806; F16H 2037/0688; F16H 48/08; F16H 57/0427
See application file for complete search history.

(56) References Cited

U.S. PATENT DOCUMENTS

| | | | | |
|---|---|---|---|---|
| 5,947,818 A | * | 9/1999 | Satzler | A01F 12/56 460/116 |
| 6,666,007 B2 | * | 12/2003 | Schroeder | A01D 41/142 56/10.6 |
| 6,932,179 B2 | * | 8/2005 | Sakikawa | B60K 17/105 180/242 |
| 6,984,172 B2 | * | 1/2006 | Talbi | A01D 41/1274 460/59 |

(Continued)

FOREIGN PATENT DOCUMENTS

CN    2725078       9/2005
CN    103786568 A   5/2014
(Continued)

OTHER PUBLICATIONS

European Search Report issued in counterpart application No. 19211586.3 dated Mar. 24, 2020 (11 pages).

*Primary Examiner* — Tinh Dang
(74) *Attorney, Agent, or Firm* — Rathe Lindenbaum LLP

(57) ABSTRACT

A vehicle transmission may include a differential comprising a carrier and at least one torque receiver fixed to the carrier, a first torque input having a first torque transmitter directly connected to with the at least one torque receiver of the carrier, and a second torque input having a second torque transmitter directly connected to the at least one torque receiver of the carrier.

21 Claims, 4 Drawing Sheets

(56) References Cited

U.S. PATENT DOCUMENTS

| | | | | |
|---|---|---|---|---|
| 7,089,824 B2* | 8/2006 | Nakatani | ................ | B60T 1/062 |
| | | | | 74/730.1 |
| 7,201,266 B2* | 4/2007 | Brissenden | .......... | B60K 17/344 |
| | | | | 192/85.63 |
| 7,204,779 B2* | 4/2007 | Irikura | ................ | B60K 17/105 |
| | | | | 475/230 |
| 7,389,847 B2* | 6/2008 | Sakikawa | .............. | A01D 69/03 |
| | | | | 180/235 |
| 8,281,890 B2* | 10/2012 | Heindl | ................ | B60K 17/105 |
| | | | | 180/242 |
| 8,574,109 B2* | 11/2013 | Heindl | ................ | F16H 61/456 |
| | | | | 475/74 |
| 9,346,208 B2* | 5/2016 | Hotani | ................ | B29C 48/395 |
| 10,514,084 B2* | 12/2019 | Watt | ...................... | A01D 46/08 |
| 2003/0199352 A1 | 10/2003 | Tsai et al. | | |
| 2006/0102409 A1* | 5/2006 | Kamada | ................ | B60K 6/365 |
| | | | | 180/249 |
| 2011/0251007 A1* | 10/2011 | Yang | ...................... | B60K 6/365 |
| | | | | 475/1 |
| 2020/0292041 A1* | 9/2020 | Zheng | ................ | B60K 17/02 |

FOREIGN PATENT DOCUMENTS

| | | |
|---|---|---|
| CN | 204136779 | 2/2015 |
| CN | 104859434 A | 8/2015 |
| CN | 106394224 | 2/2017 |
| CN | 106541819 | 3/2017 |
| DE | 19827130 A1 | 12/1999 |
| EP | 1445855 A2 | 8/2004 |
| JP | 01254424 | 10/1989 |
| JP | H06153325 A | 5/1994 |

* cited by examiner

VEHICLE TRANSMISSION

BACKGROUND

Vehicle transmissions provide the controlled transfer of power to motive members of a vehicle. Such transmissions often include a differential which permits outer drive wheels to rotate faster than inner drive wheels during a turn of the vehicle.

Figure 1:
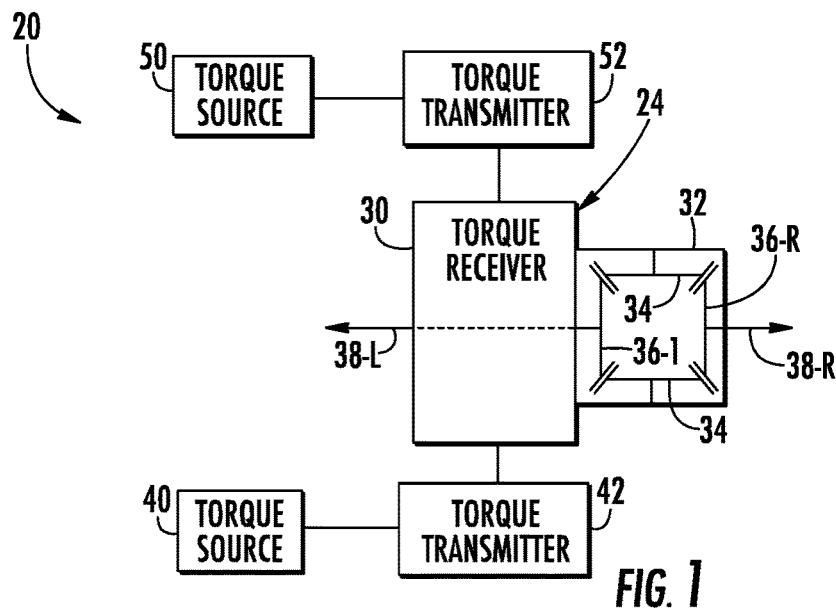
FIG. 1 is a schematic diagram illustrating portions of an example vehicle transmission.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example vehicle transmissions, vehicle transmission methods and a harvester including such a vehicle transmission, wherein the transfer of power to motor members of the vehicle through the differential is achieved using a transmission that may be more compact, that may provide a wide range of torque to speed ratios and that may offer seamless or uninterrupted transfer of speed and torque through the entire operating range of torque to speed ratios.

The example vehicle transmissions and vehicle transmission methods utilize a differential having a carrier that has and is fixed to at least one torque receiver. The at least torque receiver is directly connected to a first torque transmitter of a first torque input and a second torque transmitter of a second torque input. In other implementations, additional torque transmitters associated with additional torque inputs may also be directly connected to the at least one torque receiver of the differential carrier.

For purposes of this disclosure, a "direct connection" with respect to the at least one torque receiver and the torque transmitters means that there are no intervening components that change or alter the speed and/or torque being transmitted between the at least one torque receiver and the torque transmitters. For example, a "direct connection" between two gears means that the teeth of the two gears are in direct meshing engagement with one another. A "direct connection" between two pulleys means that the two pulleys are simply connected by an intervening belt or cable that wraps about the two pulleys. A "direct connection between two sprockets means that the two sprockets are simply connected by an intervening chain that wraps about the two sprockets.

In one implementation, the at least one torque receiver comprises first and second pulleys fixedly connected to one another and to the differential carrier, wherein the first and second torque transmitters comprise third and fourth pulleys directly connected to the first and second pulleys by first and second belts or cables, respectively. In one implementation, the at least one torque receiver comprises first and second sprockets fixedly connected to one another and to the differential carrier, wherein the first and second torque transmitters comprise third and fourth sprockets directly connected to the first and second sprockets by first and second chains, respectively. In one implementation, the at least one torque receiver comprises first and second gears fixedly connected to one another and to the differential carrier, wherein the first and second torque transmitters comprise third and fourth gears having teeth in direct meshing engagement with the first and second gears, respectively. In one implementation, the at least one torque receiver comprises a first gear fixedly connected to the differential carrier, wherein the first and second torque transmitters comprise second and third gears having teeth in concurrent and direct meshing engagement with the first gear.

The different torque inputs comprise sources of torque for rotatably driving the first and second torque transmitters. In one implementation, the torque inputs may comprise motors, such as hydraulic motors or electric motors. In some implementations, the torque inputs may comprise mechanical transmissions that transmit torque from other sources such as an internal combustion engine. In one implementation, the different torque inputs provide the same power to the respective first and second torque transmitters.

In one implementation, the differential carrier comprises a structure that carries and rotatably supports two or more differential pinion gears, sometimes referred to as spider gears, which are each in meshing engagement with the differential side gears attached to the axles. The differential carrier is itself rotatably driven by the at least one gear that is fixed to the carrier. The at least one gear, sometimes referred to as a bull gear, ring gear or a drive gear, is in concurrent meshing engagement with the first gear of the first torque input and the second gear of the second torque input. The first gear and the second gear may have different sizes for providing different torque to speed ratios.

The different torque inputs comprise sources of torque for rotatably driving the first and second gears. In one implementation, the torque inputs may comprise motors, such as hydraulic motors or electric motors. In some implementations, the torque inputs may comprise mechanical transmissions that transmit torque from other sources such as an internal combustion engine. In one implementation, the different torque inputs provide the same power to the respective first and second gears.

Disclosed is an example vehicle transmission. The example vehicle transmission may include a differential comprising a carrier and at least one torque receiver fixed to the carrier, a first torque input having a first torque transmitter directly connected to with the at least one torque receiver of the carrier, and a second torque input having a second torque transmitter directly connected to the at least one torque receiver of the carrier.

Disclosed is an example vehicle transmission. The example vehicle transmission may include a differential having a carrier having and fixed to at least one gear, a first torque input having a first gear directly meshing with the at least one gear of the input, and a second torque input having a second gear directly meshing with the at least one gear of the carrier.

Disclosed herein is an example vehicle transmission. The example method comprises supplying a first amount of torque from a first torque input to a carrier of a differential having at least one torque receiver, the first amount of torque being supplied with a first torque transmitter directly connected to the at least one torque receiver. The method further comprises supplying a second amount of torque from a second torque input to the carrier of the differential, the second amount of torque being supplied with a second torque transmitter directly connected to the at least one torque receiver.

Disclosed herein is an example vehicle transmission method. The method may include supplying a first amount of torque from a first torque input to a carrier of a differential having at least one gear, the first amount of torque being supplied with a first gear in direct meshing engagement with the at least one gear. The method may further include supplying a second amount of torque from a second torque input to the carrier of the differential, the second amount of torque being supplied with a second gear in direct meshing engagement with the at least one gear.

Disclosed herein is an example harvester. The example harvester may include a frame or chassis, a crop threshing mechanism carried by the frame, ground engaging harvester propelling or motive members and a vehicle transmission for supplying power from the power source to the ground engaging harvester propelling members. The vehicle transmission may include a differential having a carrier having and fixed to at least one torque receiver, a first torque input having a first torque transmitter directly connected to the at least one torque receiver of the differential carrier and a second torque input having a second torque transmitter directly connected to the at least one torque receiver of the carrier.

In one implementation, the torque receiver or receivers in the torque transmitters may specifically comprise gears. In such an implementation, the vehicle transmission of the harvester may include a differential having a carrier having and fixed to at least one gear, a first torque input having a first gear directly meshing with the at least one gear of the carrier and a second torque input having a second gear directly meshing with the at least one gear of the carrier.

FIG. 1 is a schematic diagram of an example vehicle transmission 20. Transmission 20 transmits power to propelling or motive members of the vehicle through the differential that that may be more compact, that may provide a wide range of torque to speed ratios and that may offer continuous and smooth transmission between different ranges of torque to speed ratios. Transmission 20 comprises differential 24 and torque inputs 26, 28.

Differential 24 comprises an arrangement of gears such that the averaged rotational speed of the two output shafts 38L, 38R is equal to the rotational speed of the differential carrier assembly 24, or a fixed multiple of the differential carrier assembly's rotational speed. Differential 24 permits the outer drive wheels of a vehicle to rotate faster than the inner drive wheels as the vehicle is turning. Such drive wheels may be in the form of tires or in the form of wheels and/or sprockets that drive a propelling or motive member in the form of a web or track. Differential 24 comprises at least one torque receiver 30, carrier 32, pinion gears 34, side gears 36-L, 36-R (collectively referred to as gears 36) and axles 38-L, 38-R (collectively referred to as axles 38).

The at least one torque receiver 30 is fixedly connected to carrier 32 so as to rotate in unison with carrier 32. The at least one torque receiver 30 receives torque from both of torque inputs 26 and 28 to rotatably drive carrier 32. In one implementation, the at least one torque receiver 30 comprises multiple torque receivers which are each fixedly connected to carrier 32 and which are each driven by different torque inputs. In another implementation, the at least one torque receiver 30 comprises a single torque receiver that is concurrently directly connected to torque transmitters of the torque inputs 26, 28.

Differential carrier 32 rotates with the rotation of the at least one drive torque receiver 30. Carrier 32 carries pinion gears 34 for rotation about the rotational axis of carrier 32 and the at least one drive gear 30. Carrier 32 rotatably supports each of pinion gears 34 for rotation about axes that are distinct from the axis of the at least one drive gear 30. In one implementation, carrier 32 rotatably supports each of the pinion gears 34 for rotation about axes that are perpendicular to the axis of the at least one drive gear 30.

Pinion gears 34 comprise gears that are equi-distantly spaced from one another about the rotational axis of carrier 32 and which are each in meshing engagement with side gears 36-L and 36-R. The side gears 36-L and 36-R are affixed to their respective axles 38-L and 38-R, respectively. The axles transmit torque to the ground engaging motive or vehicle propelling members. In one implementation, the pinion gears 34 and the side gears 36 comprise spur gears. In other implementations, the pinion gears 34 and the side gears 36 comprise bevel gears, worm gears or helical gears.

Torque inputs 26 and 28 supply torque to the at least one drive gear 30. Torque input 26 comprises torque source 40 and first torque transmitter 42 while torque input 28 comprises torque source 50 and second torque transmitter 52. Torque sources 40 and 50 rotatably drive torque transmitters 42 and 52, respectively. In one implementation, torque sources 40 and 50 comprise similar types of torque sources. For example, in one implementation, torque sources 40 and 50 each comprise a hydraulic motor. In one implementation, torque sources 40 and 50 each comprise an electric motor. In one implementation, torque sources 40 and 50 each comprise a mechanical torque transmitting shaft or other torque transmitting member that transmits torque generated by an internal combustion engine. In yet other implementations, torque sources 40 and 50 may comprise different types of torque sources. In one implementation, torque sources 40 and 50 supply similar levels of power to their respective gears 42 and 52.

Torque transmitters 42 and 52 are each directly or indirectly operably coupled to the output of the respective torque sources 40 and 50. In one implementation, both of such torque sources 40, 50 are directly connected to the respective torque transmitters 42 and 52. For example, in implementations where torque sources 40, 50 comprise motors, torque transmitters 42 and 52 may be directly connected to or affixed to the output shafts of such motors. In other implementations, one or both of torque transmitters 42, 52 may be indirectly coupled to the respective torque sources 40, 50 by intermediate speed altering powertrains. In some implementations, one of torque transmitters 42, 52 may be indirectly coupled to its torque source 40, 50 by at least one intervening clutch. The provision of a clutch may extend the torque to speed range provided by transmission 20 while also reducing a likelihood that a particular torque source will be over driven or damaged.

In one implementation, the at least one torque receiver 30 comprises first and second pulleys fixedly connected to one another and to the differential carrier 32, wherein the first and second torque transmitters 42, 52 comprise third and fourth pulleys directly connected to the first and second pulleys by first and second belts or cables, respectively. In one implementation, the at least one torque receiver 30 comprises first and second sprockets fixedly connected to one another and to the differential carrier 32, wherein the first and second torque transmitters 42, 52 comprise third and fourth sprockets directly connected to the first and second sprockets by first and second chains, respectively.

In one implementation, the at least one torque receiver 30 comprises first and second gears fixedly connected to one another and to the differential carrier 32, wherein the first and second torque transmitters 42, 52 comprise third and fourth gears having teeth in direct meshing engagement with the first and second gears, respectively. In one implementation, the at least one torque receiver 30 comprises a first gear fixedly connected to the differential carrier, wherein the first and second torque transmitters 42, 52 comprise second and third gears having teeth in concurrent and direct meshing engagement with the first gear. For example, the at least one torque receiver 30 may comprise a drive gear, also sometimes referred to as a bull gear, that is fixed to carrier 32, wherein the at least one torque receiver 30 and the carrier 32 rotate about a same axis. In one implementation, the at least one torque receiver 30 may comprise at least one spur gear. In other implementations, the at least one torque receiver may comprise at least one bevel gear or helical gear.

Torque transmitters 42, 52 are each directly connected to the at least one torque receiver 30. In the example illustrated, torque transmitter 42 has a smaller diameter as compared to torque transmitter 52. Torque transmitter 42 drives the at least one torque receiver 30 and carrier 32 at a lower input speed relative to torque transmitter 52. Torque transmitter 52 drives the at least one torque receiver 30 and carrier 32 at a higher input speed relative to torque transmitter 42. As the speed of the vehicle is being increased, the ratio of total power delivered to the at least one torque receiver 30 will transition from being principally or solely from torque transmitter 42 at lower ground speeds to principally or solely from torque transmitter 52 at higher ground speeds. At higher ground speeds, torque source 40 may be over driven. In implementations where torque transmitter 42 is indirectly coupled to torque source 40 by and intervening clutch, the clutch prevents torque source 40 from being over driven while the vehicle is driven at higher speeds through power delivered by torque transmitter 52. In one implementation, the at least one torque receiver 30 and torque transmitters 42, 52 comprise spur gears. In other implementations, drive gears 30 and gears 42, 52 may comprise bevel gears or helical gears. In yet other implementations, the at least one torque receiver 30 and torque transmitters 42, 52 comprise pulleys or sprockets directly connected to one another by intervening belts or chains, respectively.

In one implementation, torque sources 40, 50 supply similar levels of power to torque transmitters 42 and 52. For example, in one implementation in which torque sources 40, 50 comprise hydraulic motors, hydraulic motors 40, 50 are plumbed in a parallel hydraulic arrangement. Torque transmitters 42 and 52 are differently sized thus to provide different torque to speed ratios to the at least one torque receiver 30. In one implementation, torque transmitter 42 may comprise a gear having a root diameter of between 120 mm and 140 mm while torque transmitter 52 may comprise a gear having a root diameter of between 200 mm and 220 mm. In one implementation, the diameter of the gear of torque transmitter 52 is sized 80%-100% larger than the diameter of the gear of torque transmitter 42, wherein the gears of torque transmitters 42 and 52 collectively allow for a transmission of a corner power of up to 2005 kW while also providing the corresponding, discrete operating points of maximum transmission output torque and maximum transmission output speed with uninterrupted transfer of torque and speed throughout this entire operating range. This wide range of torque to speed ratios provides high ground drive torque in circumstances where high degrees of torque at work speeds are required, such as when the vehicle is propelling up a steep gradient or hill at a work speed or is encountering resistance such as when harvesting in or propelling through soils of low cone index. This wide range of torque to speed ratios also provides a high vehicle speed at a reduced ground drive torque in circumstances where the vehicle is traveling at high ground speeds, such as when the vehicle is transporting to or from a field on a highway or other road. The described transmission arrangement and associated wide range of torque to speed ratios allow seamless or uninterrupted transitions between operating states of high ground drive torques at work speeds and operating states of low ground drive torques at high ground speeds.

Figure 2:
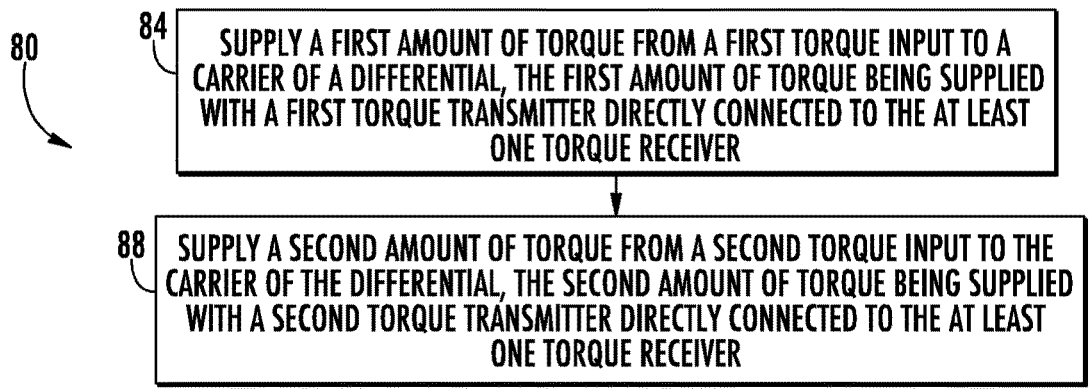
FIG. 2 is a flow diagram of an example vehicle transmission method.

FIG. 2 is a flow diagram of an example vehicle transmission method 80. Method 80 delivers power to motive or propulsion members of a vehicle through the differential, achieved using a transmission that may be more compact, that may provide a wide range of torque to speed ratios and that may offer continuous or uninterrupted power transmission between different ranges of torque to speed ratios. Although method 80 is described in the context of being carried out by transmission 20 described above, it should be appreciated that method 80 may likewise be carried out with any of the following described vehicle transmissions or with other similar vehicle transmissions.

As indicated by block 84, a first torque transmitter 42 of a first torque input 26 is supplied to carrier 32 of differential 24 having at least one torque receiver 30. The torque is applied with torque transmitter 42 that is in direct contact with the least one torque receiver 30.

As indicated by block 88, a second torque transmitter 52 of a second torque input 28 is supplied to carrier 32 of differential 24 having at least one torque receiver 30. The torque is applied with torque transmitter 52 that is in direct connection with the least one torque receiver 30.

Figure 3:
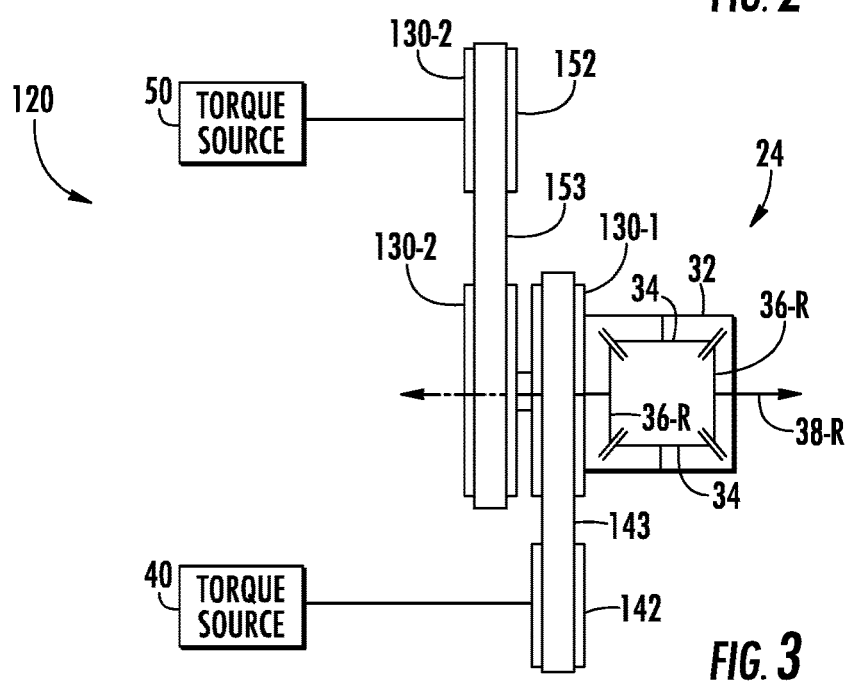
FIG. 3 is a schematic diagram illustrating portions of an example vehicle transmission.

FIG. 3 is a schematic diagram of an example vehicle transmission 120. Transmission 120 transmits power to propelling or motive members of the vehicle through the differential that that may be more compact, that may provide a wide range of torque to speed ratios and that may offer continuous and smooth transmission between different ranges of torque to speed ratios. Transmission 120 is similar to transmission 120 described above except that transmission 120 specifically comprises torque receivers 130-1, 130-2 and torque transmitters 142 and 152 in place of the at least one torque receiver 130 and torque transmitters 42 and 52, respectively. Transmission 120 additionally comprises flexible connectors 143 and 153. Those remaining components of transmission 120 which correspond to components of transmission 20 are numbered similarly.

Torque receivers 130-1, 130-2 (collectively referred to as torque receivers 130) comprise members that are fixed to one another and fixed to carrier 32. Torque receivers 130-1, 130-2 are directly connected to torque transmitters 142, 152 by flexible connectors 143, 153, respectively. Torque transmitters 142, 152 are comprise members that are rotatably driven by torque sources 40 and 50, respectively. In the example illustrated, torque transmitters 142 and 152 are differently sized, having different diameters. In another implementation, torque transmitters 142, 152 may be similarly sized or have the same size, but where torque receivers 130-1, 130-2 are differently sized or have different diameters with respect to one another.

In one implementation, torque receivers 130 and torque transmitters 142, 152 comprise pulleys (also sometimes referred to as pulley wheels or sheaves), whereas flexible connectors 143 and 153 comprise belts or cables. In another implementation, torque receivers 130 and torque transmitters 142, 152 comprise sprockets, whereas flexible connectors 143 and 153 comprise chains.

Figure 4:
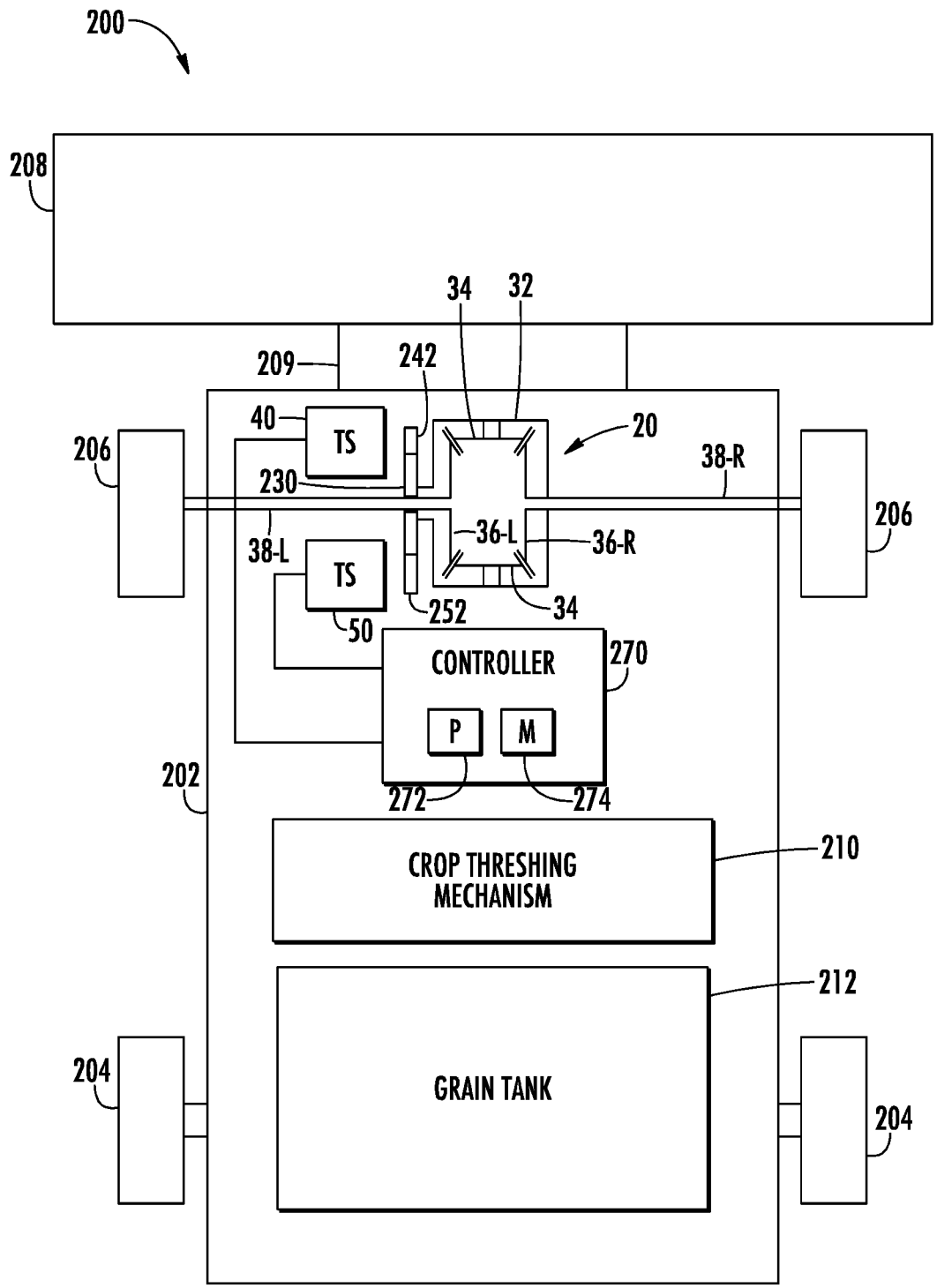
FIG. 4 is a schematic diagram illustrating portions of an example harvester including the example vehicle transmission of FIG. 1.

FIG. 4 is a diagram schematically illustrating an example harvester 200 that includes a transmission 220. Transmission 220 is similar to transmission 20 described above except that transmission 220 comprises a single torque receiver in the form of a gear 230 and a pair of torque transmitters in the form of gears 242, 252. Gear 230 is fixedly connected to the differential carrier 32, wherein the first and second gears 242, 252 have teeth in concurrent and direct meshing engagement with the gear 230. Gear 230 serves as a drive gear, also sometimes referred to as a bull gear, that is fixed to carrier 32, wherein gear 230 and the carrier 32 rotate about a same axis. In one implementation, gear 230 may comprise at least one spur gear. In other implementations, gear 230 may comprise at least one bevel gear or helical gear.

Gears 242, 252 are each directly connected gear 230. In the example illustrated, gear 242 has a smaller diameter as compared to gear 252. Gear 242 drives gear 230 and carrier 32 at a lower input speed relative to gear 252. Gear 252 drives torque receiver 230 and carrier 32 at a higher input speed relative to gear 242. As the speed of the vehicle is being increased, the ratio of total power delivered to gear 230 will transition from being principally or solely from gear 242 at lower ground speeds to principally or solely from gear 252 at higher ground speeds. At higher ground speeds, torque source 40 may be over driven. In implementations where gear 42 is indirectly coupled to torque source 40 by and intervening clutch, the clutch prevents torque source 40 from being over driven while the vehicle is driven at higher speeds through power delivered by gear 52. In one implementation, gear 230 and gears 242, 252 comprise spur gears. In other implementations, drive gear 30 and gears 242, 252 may comprise bevel gears or helical gears. In yet other implementations, gear 230 and gears 242, 252 comprise pulleys or sprockets directly connected to one another by intervening belts or chains, respectively.

In one implementation, torque sources 40, 50 supply similar levels of power to gears 42 and 52. For example, in one implementation in which torque sources 40, 50 comprise hydraulic motors, hydraulic motors 40, 50 are plumbed in a parallel hydraulic arrangement. Gears 42 and 52 are differently sized thus to provide different torque to speed ratios to the at least one torque receiver 30. In one implementation, gear 42 may have a root diameter of between 120 mm and 140 mm while gear 52 may have a root diameter of between 200 mm and 220 mm. In one implementation, the diameter of the gear 52 is sized 80%-100% larger than the diameter of the gear of torque transmitter 42, wherein the gears 42 and 52 collectively allow for a transmission of a corner power of up to 2005 kW while also providing the corresponding, discrete operating points of maximum transmission output torque and maximum transmission output speed with uninterrupted transfer of torque and speed throughout this entire operating range. This wide range of torque to speed ratios provides high ground drive torque in circumstances where high degrees of torque at work speeds are required, such as when the vehicle is propelling up a steep gradient or hill at a work speed or is encountering resistance such as when harvesting in or propelling through soils of low cone index. This wide range of torque to speed ratios also provides a high vehicle speed at a reduced ground drive torque in circumstances where the vehicle is traveling at high ground speeds, such as when the vehicle is transporting to or from a field on a highway or other road. The described transmission arrangement and associated wide range of torque to speed ratios allow seamless or uninterrupted transitions between operating states of high ground drive torques at work speeds and operating states of low ground drive torques at high ground speeds.

In other implementations, transmission 220 may be replaced with a transmission similar to transmission 120 described above. In addition to transmission 220, harvester 200 comprises frame 202, rear motive members 204, front motive members 206, header 208, feederhouse 209 crop threshing mechanism 210, grain tank 212, vehicle transmission 20 and controller 270. Frame 202 supports the remaining components of harvester 200.

Rear motive members 204 engage the ground at a rear of harvester 200. In one implementation, rear motive members 204 comprise wheels in the form of tires. In another implementation, rear motive members 204 may comprise wheels and/or sprockets and tracks or webs that are supported by the wheels and/or sprockets. In one implementation, rear motive members 204 are rotationally supported for pivoting about a vertical axis and are turnable to facilitate steering of harvester 200.

Front motive members 206 engage the ground at a front of harvester 200 proximate to header 208. In one implementation, front motive members 206 comprise wheels in the form of tires. In another implementation, front motive members 206 comprise wheels and/or sprockets and tracks or webs that are driven by the wheels and/or sprockets. Front motive members 206 are rotationally driven by vehicle transmission 20. In the example illustrated, harvester 200 is a front drive vehicle. In other implementations, rear motive members 204 may be rotationally driven by vehicle transmission 20.

Header 208 (schematically shown) extends at a front of harvester 200. Header 208 severs or separates crops from a growing medium and gathers the crops for conveyance to crop threshing mechanism 210. In one implementation, header 208 may comprise a reel for directing crops across a cutter bar to sever the crops, wherein the crops are further gathered and conveyed by augers and/or draper belts to feederhouse 209 which conveys crops rearwardly to crop threshing mechanism 210. In another implementation, header 208 may comprise row units having stalk rolls that pull crop plants between stripper plates and gathering chains that convey the stripped crop, such as ears of corn, towards rearwardly located augers that further convey the stripped crop to feeder house 209. In another implementation, header 208 may comprise of a draper belt or draper belts that along with a windscreen convey windrowed crops from the growing medium rearwardly to feederhouse 209 which conveys crops rearwardly to crop threshing mechanism 210.

Crop threshing mechanism 210 (schematically shown) threshes or further separates grain from material other than grain, also referred to as MOG, such as stalks, cobs, husks, leaves and the like. A cleaning system cleans the grain and the clean grain is conveyed to grain tank 212 while the material other than grain is discharged at a rear of harvester 200 by means of a residue system. In one implementation, crop threshing mechanism 210 may comprise a drum and walker thresher design. In other implementations, crop threshing mechanism 210 may comprise a rotary threshing design. In other implementations, crop threshing mechanism 210 may comprise a hybrid of a drum and walker thresher design and a rotary threshing design.

Vehicle transmission 220 operates under the control of controller 270. Controller 270 comprises processing unit or processor 272 and a non-transitory computer-readable medium 274. Processor 272 outputs control signals to torque sources 40 and 50 in accordance with instructions provided by memory 274. Memory 274 comprises logic, programming or code embodying instructions said direct the processor 272. Instructions provided by memory 274 may direct processor 272 to output control signals adjusting the degree of speed and/or torque provided by torque sources 40 and 50. For example, in implementations where torque sources 40, 50 comprise electric motors, such control signals may adjust speed and/or torque delivered by electric motors. In implementations where torque sources 40 and 50 comprise hydraulic motors, such control signals may adjust speed and/or torque delivered by the hydraulic motors. In some implementations, the control signals may adjust the output of a hydraulic pump and/or various valves that control the supply of hydraulic fluid to the hydraulic motors serving as torque sources 40, 50. Such control signals may be further based upon operator commands controlling the speed at which harvester 200 is traversed across a field and/or the speed and torque at which motive members 206 are to be driven. Such control signals may also be based upon system fault conditions and/or incoming signals from other vehicle controllers during specific machine operating modes.

Figure 5:
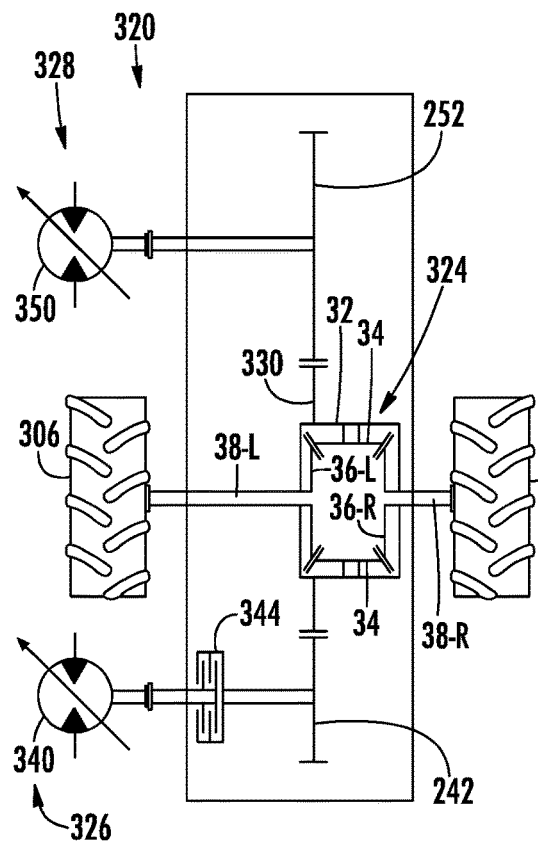
FIG. 5 is a schematic diagram illustrating portions of an example vehicle transmission.

FIG. 5 is a diagram schematically illustrating vehicle transmission 320 for driving ground motive members 306. Vehicle transmission 320 may be utilized in harvester 200 described above, in any of the following described harvesters or in any similar harvester or other vehicle. Vehicle transmission 320 comprises differential 324 and torque inputs 326, 328. Those components of vehicle transmission 320 which correspond to components of vehicle transmission 20 are numbered similarly.

Differential 324 comprises an arrangement of gears such that the averaged rotational speed of the two output shafts 38L, 38R is equal to the rotational speed of the differential carrier assembly 324, or a fixed multiple of the differential carrier's rotational speed. Differential 324 permits the outer drive wheels of a vehicle to rotate faster than the inner drive wheels as the vehicle is turning. Such drive wheels may be in the form of tires or in the form of wheels and/or sprockets that drive a propelling or motive member in the form of a web or track. Differential 324 comprises a single drive gear 330, carrier 32, pinion gears 34, side gears 36-L, 36-R (collectively referred to as gears 36) and axles 38-L, 38-R (collectively referred to as axles 38). carrier 32, pinion gears 34, side gears 36 and axles 38 are each described above with respect to transmission 20.

Drive gear 330, also sometimes referred to as a bull gear, ring gear or drive gear, is fixed to carrier 32, wherein drive gear 330 and the carrier 32 rotate about a same axis. In one implementation, drive gear 330 may comprise at least one spur gear. In other implementations, the drive gear 330 may comprise at least one bevel gear or helical gear.

Torque inputs 326 and 328 supply torque to the single drive gear 330. Torque input 326 comprises torque source 340, first gear 242 and clutch 344. In the example illustrated, torque source 340 comprises a motor in the form of an adjustable hydraulic motor. In other implementations, torque source 340 may comprise a non-adjustable hydraulic motor, an electric motor or a mechanical source of torque, transmitting torque supplied by an internal combustion engine. Torque source 340 provides torque to gear 242. In the example illustrated, torque source 340 is indirectly connected to or indirectly coupled to gear 242 by the intervening clutch 344.

Clutch 344 connects torque source 340 to gear 242 at low speed and high torque conditions. Clutch 344 automatically disconnects gear 242 from torque source 340 at high speed, low torque operating conditions, such as when carrier 32 is being rotationally driven by torque input 328. This transmission arrangement comprising clutch 344 reduces the likelihood of damage to torque source 340 resulting from torque source 340 being overdriven during such high-speed conditions and provides improved system efficiency at high machine ground speeds as a result of reduced parasitics. In the example illustrated, clutch 344 is directly connected to an output shaft of torque source 340 and is directly connected to gear 242. In other implementations, clutch 340 may be indirectly connected to torque source 340 and/or gear 242. In some implementations, clutch 344 may be omitted.

Torque input 328 comprises torque source 350 and gear 252. In the example illustrated, torque source 350 comprises a motor in the form of an adjustable hydraulic motor. In other implementations, torque source 350 may comprise a non-adjustable hydraulic motor, an electric motor or a mechanical source of torque, transmitting torque supplied by an internal combustion engine. Torque source 350 provides torque to gear 252. In the example illustrated, torque source 350 is directly connected to or coupled to gear 252. Gear 252 is directly connected to an output shaft of torque source 350, facilitating a fewer component, more compact and less expensive transmission 320. In another implementation, torque source 350 may be directly or indirectly coupled to gear 252 by an intervening clutch, similar to the arrangement described and shown for torque source 340.

Gears 242 and 252 (described above) are each in concurrent meshing engagement with drive gear 330. In the example illustrated, gear 242 has a smaller diameter as compared to gear 252. Gear 242 drives gear 330 and carrier 32 at a lower input speed relative to gear 252. Gear 252 drives gear 330 and carrier 32 at a higher input speed relative to gear 242. As the speed of the vehicle is being increased, the ratio of total power delivered to gear 330 will transition from being principally or solely from gear 242 at lower ground speeds to principally or solely from gear 252 at higher ground speeds. At higher ground speeds, the clutch 344 prevents torque source 340 from being over driven while the vehicle is driven at higher speeds through power delivered by gear 252.

Figure 6:
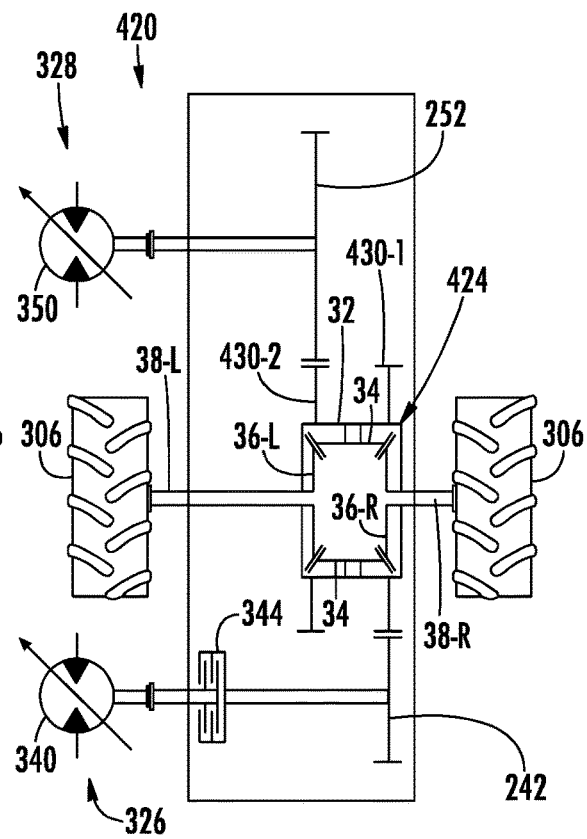
FIG. 6 is a schematic diagram illustrating portions of an example vehicle transmission.

FIG. 6 is a diagram schematically illustrating portions of an example vehicle transmission 420. Vehicle transmission 420 may be employed in place of transmission 20 in vehicle 200 or, in some implementations, is utilized in any of the other vehicles described hereafter. Vehicle transmission 420 is similar to vehicle transmission 320 described above except that vehicle transmission 420 comprises differential 424 in place of differential 324. Differential 424 is itself similar to differential 324 except that differential 424 comprises multiple drive gears 430-1, 430-2 (collectively referred to as drive gears 430) affixed to carrier 32. Those remaining components of vehicle transmission 420 which correspond to components of vehicle transmission 320 are numbered similarly.

Drive gears 430 extend from and are fixed to carrier 32. Drive gear 430-1 is in direct meshing engagement with gear 242. Drive gear 430-2 is in direct meshing engagement with gear 252. In one implementation, drive gears 430 may comprise spur gears. In other implementations, drive gears 430 may comprise bevel gears, helical gears or any combination thereof. The provision of multiple drive gears may facilitate a more compact arrangement of transmission 420.

Such multiple drive gears 430 may, in some implementations, further facilitate the direct connection of additional torque inputs to the drive gears 430 that are affixed to carrier 32. For example, in some implementations, at least one additional torque input, similar to either torque input 326 or torque input 328 may be connected to carrier 32. In one implementation, carrier 32 may include yet an additional third drive gear 430 affixed to carrier 32. In yet another implementation, a carrier may have a gear, similar to gear 242 or gear 252, in direct meshing engagement with a different circumferential portion of gear 430-1 or gear 430-2, such that the particular gear 400-1 or gear 430-2 is in concurrent direct meshing engagement with multiple gears of multiple torque inputs.

Figure 7:
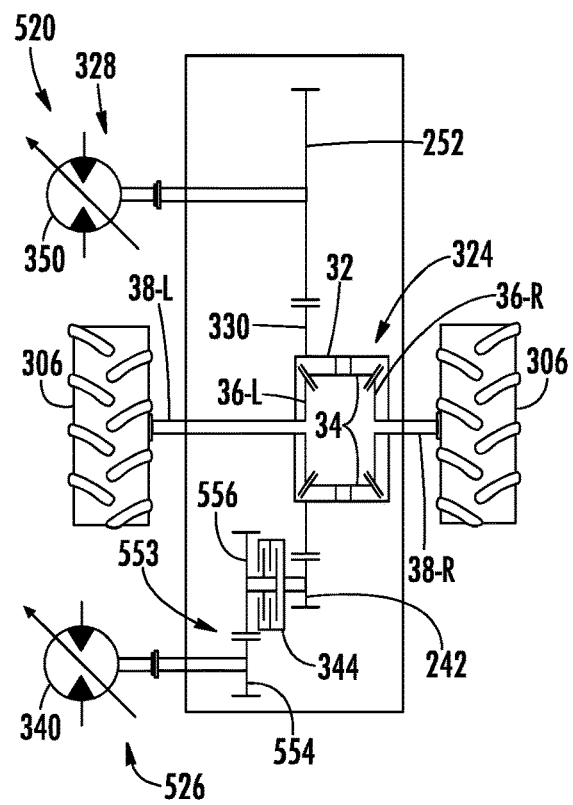
FIG. 7 is a schematic diagram illustrating portions of an example vehicle transmission.

FIG. 7 is a diagram schematically illustrating portions of an example vehicle transmission 520. Vehicle transmission 520 may be employed in place of transmission 20 in vehicle 200 or, in some implementations, is utilized in any of the other vehicles described hereafter. Vehicle transmission 520 is similar to vehicle transmission 320 described above except that vehicle transmission 520 comprises torque input 526 in place of torque input 326. Those remaining components of vehicle transmission 520 which correspond to components of vehicle transmission 320 are numbered similarly.

Torque input 526 is itself similar to torque input 326 except that torque input 526 additionally comprises an intermediate gear train between the output shaft of torque source 340 and gear 242. The intermediate gear train is composed of gears 554 and 556. Gear 554 is directly connected to the output shaft of torque source 340 and is in direct meshing engagement with gear 556. Gear 556 is directly connected to an input side of clutch 344 which has an output side directly connected to gear 242. The extra gear train 553 provided by gears 554, 556 alters the speed and torque delivered to the input side of clutch 344.

Figure 8:
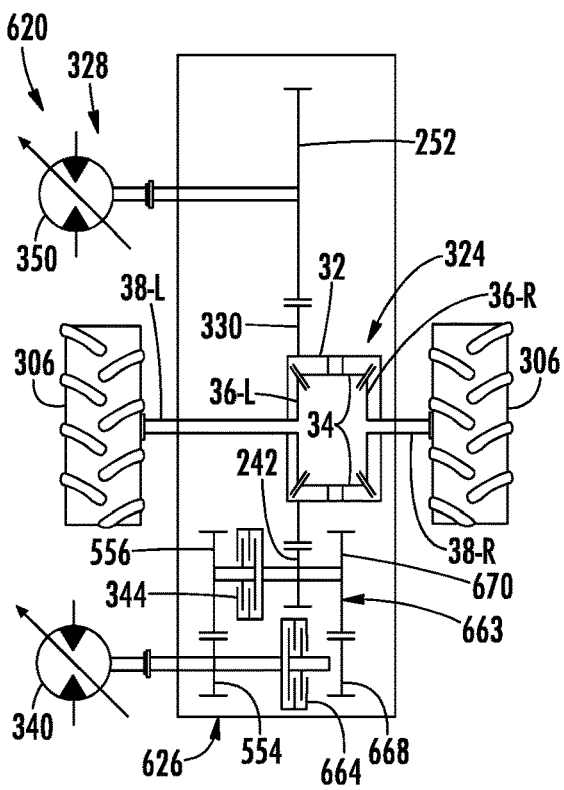
FIG. 8 is a schematic diagram illustrating portions of an example vehicle transmission.

FIG. 8 is a diagram schematically illustrating portions of an example vehicle transmission 620. Vehicle transmission 620 may be employed in place of transmission 20 in vehicle 200 or, in some implementations, is utilized in any of the other vehicles described hereafter. Vehicle transmission 620 is similar to vehicle transmission 520 except that vehicle transmission 620 comprises torque input 626 in place of torque input 526. Those remaining components of transmission 620 which correspond to components of transmission 520 are numbered similarly.

Torque input 626 is similar to torque input 526 except that torque input 626 additionally comprises gear train 663 and clutch 664. Gear train 663 comprise a second gear train operably coupled to gear 242 for transmitting power from torque source 340 to carrier 32 of differential 324. Gear train 663 comprises gear 668 and gear 670. Gear 668 is operably coupled to an output side of clutch 664 and is in meshing engagement with gear 670. Gear 670 is affixed to gear 242 so as to rotate in unison with gear 42. Clutch 664 is connected between gear 554 and gear 668. Clutch 664 connects and disconnects the transmission of torque directly from torque source 340 to gear 668.

Figure 9:
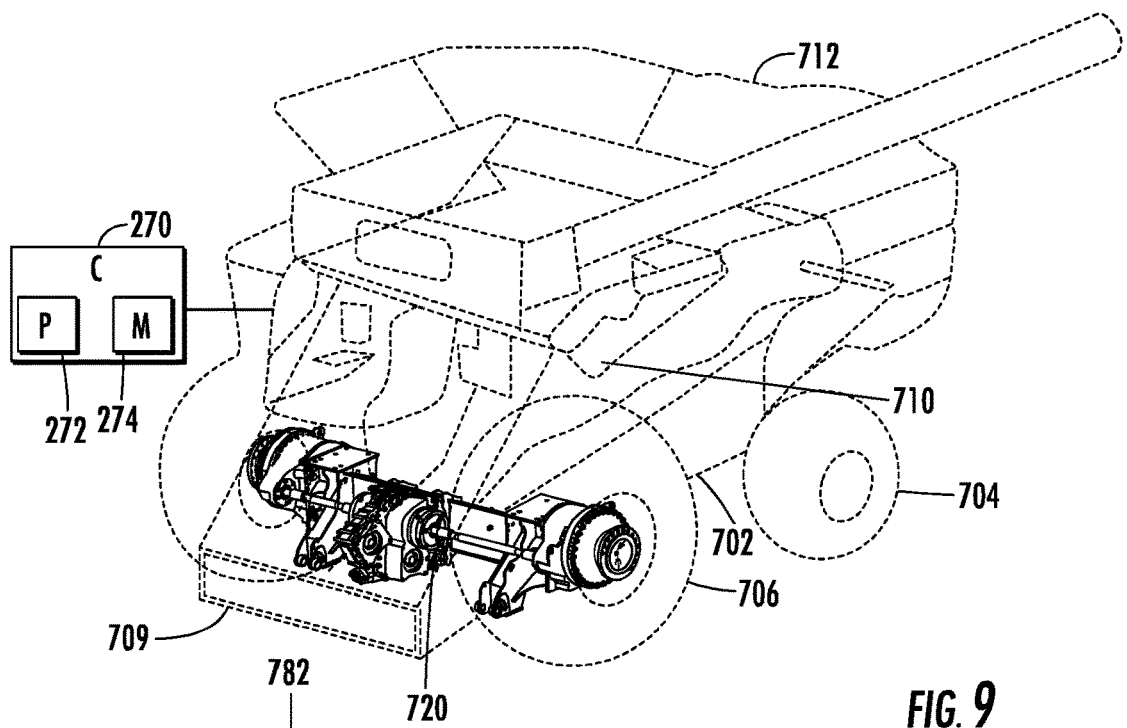
FIG. 9 is a perspective view illustrating portions of an example harvester, with portions transparently shown, including an example vehicle transmission.

FIG. 9 is a perspective view illustrating portions of an example harvester 700. Portions of harvester 700 are transparently shown to illustrate vehicle transmission system 720, comprising a transmission, front axle, driveshafts and final drive gearboxes. In addition to vehicle transmission system 720, harvester 700 comprises frame 702, rear motive members 704, front motive members 706, header 208 (shown and described above with respect to FIG. 3), feederhouse 709, crop threshing mechanism 710, grain tank 712 and controller 270 (described above). Frame 702 supports the remaining components of harvester 700.

Rear motive members 704 engage the ground at a rear of harvester 700. In one implementation, rear motive members 704 comprise wheels in the form of tires. In another implementation, rear motive members 704 may comprise wheels and/or sprockets and tracks or webs that are supported by the wheels and/or sprockets. In the example illustrated, rear motive members 704 are rotationally supported for pivoting about a vertical axis and are turnable to facilitate steering of harvester 700.

Front motive members 706 engage the ground at a front of harvester 700 proximate to feeder house 709. In one implementation, front motive members 706 comprise wheels in the form of tires. In another implementation, front motive members 706 comprise wheels and/or sprockets and tracks or webs that are driven by the wheels and/or sprockets. Front motive members 706 are rotationally driven by vehicle transmission 720. In the example illustrated, harvester 700 is a front drive vehicle. In other implementations, rear motive members 704 may be rotationally driven by vehicle transmission system 720.

Crop threshing mechanism 710 threshes or further separates grain from material other than grain, also referred to as MOG, such as stalks, cobs, husks, leaves and the like. A cleaning system cleans the grain and the clean grain is conveyed to grain tank 712 while the material other than grain to be discharged at a rear of harvester 700 by means of a residue system. In the example illustrated, crop threshing mechanism 710 comprises a rotary threshing design. In another implementation, crop threshing mechanism 710 may comprise a drum and walker thresher design. In other implementations, crop threshing mechanism 710 may comprise a hybrid of a drum and walker thresher design and a rotary threshing design.

Figure 10:
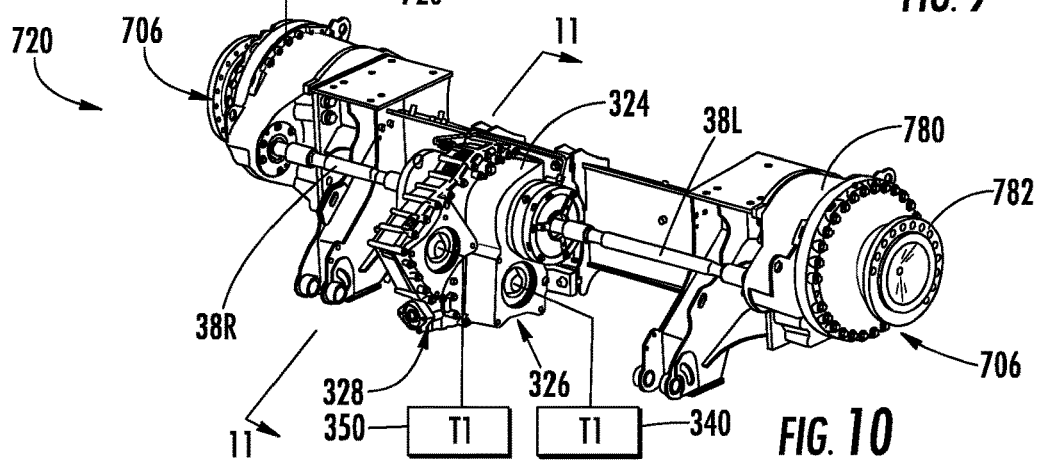
FIG. 10 is a perspective view of the example vehicle transmission of the harvester of FIG. 9.
Figure 11:
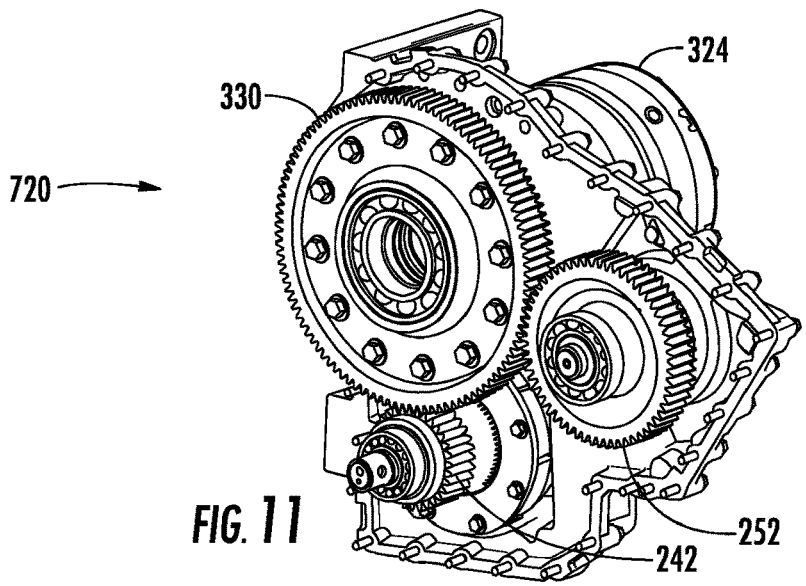
FIG. 11 is a perspective view illustrating portions of the example vehicle transmission of FIG. 9 taken along line 11-11.

FIGS. 10 and 11 illustrate vehicle transmission system 720 in more detail. FIG. 11 is generally taken along line 11-11 of FIG. 10. As shown by FIG. 10, vehicle transmission system 720 comprises differential 324 and torque inputs 326, 328. Differential 324 is described above. FIG. 11 illustrates the single drive gear 330, also referred to as a bull gear, in the form of a spur gear. As described above and schematically shown in FIG. 5, drive gear 330 is affixed to the internal carrier 32 which supports pinion gears 34 which are in meshing engagement with side gears 36 which are affixed to drive axles 38. As shown by FIG. 10, drive axles 38 are each operably coupled to an internal gearbox 780 containing an internal gear train that transmits torque from the drive axles 38 to the spindles 782 of the front motive members 706. In other implementations, drive axles 38 may be operably coupled to motive members 706 in other fashions.

Torque inputs 326 and 328 supply torque to the single drive gear 330. Torque input 326 comprises torque source 340, first gear 242 (shown in FIG. 11) and clutch 344 (schematically shown in FIG. 5). In the example illustrated, torque source 340 comprises a motor in the form of an adjustable hydraulic motor. In other implementations, torque source 340 may comprise a non-adjustable hydraulic motor, an electric motor or a mechanical source of torque, transmitting torque supplied by an internal combustion engine. Torque source 340 provides torque to gear 242. In the example illustrated, torque source 340 is indirectly connected to or coupled to gear 242 by the intervening clutch 344.

Clutch 344 connects torque source 340 to gear 42 at low speed and high torque conditions. Clutch 344 automatically disconnects gear 242 from torque source 340 at high speed, low torque operating conditions, such as when carrier 32 is being rotationally driven by torque input 328. This transmission arrangement comprising clutch 344 reduces the likelihood of damage to torque source 340 resulting from torque source 340 being overdriven during such high-speed conditions and provides improved system efficiency at high machine ground speeds as a result of reduced parasitics. In the example illustrated, clutch 344 is directly connected to an output shaft of torque source 340 and is directly connected to gear 242. In other implementations, clutch 340 may be indirectly connected to torque source 340 and/or gear 242. In some implementations, clutch 344 may be omitted.

Torque input 328 comprises torque source 350 and gear 52 (shown in FIG. 11). In the example illustrated, torque source 350 comprises a motor in the form of an adjustable hydraulic motor. In other implementations, torque source 350 may comprise a non-adjustable hydraulic motor, an electric motor or a mechanical source of torque, transmitting torque supplied by an internal combustion engine. Torque source 350 provides torque to gear 252. In the example illustrated, torque source 350 is directly connected to or coupled to gear 252. Gear 252 is directly connected to an output shaft of torque source 350, facilitating a fewer component, more compact and less expensive transmission 320. In another implementation, torque source 350 may be directly or indirectly coupled to gear 252 by an intervening clutch, similar to the arrangement described and shown for torque source 340.

Gears 242 and 252 (described above) are each in concurrent meshing engagement with drive gear 330. In the example illustrated, gear 242 has a smaller diameter as compared to gear 252. Gear 242 drives the at least one gear 330 and carrier 32 at a lower input speed relative to gear 252. Gear 252 drives the at least one gear 230 and carrier 32 at a higher input speed relative to gear 242. As the speed of the vehicle is being increased, the ratio of total power delivered to gear 330 will transition from being principally or solely from gear 242 at lower ground speeds to principally or solely from gear 252 at higher ground speeds. At higher ground speeds, the clutch 344 prevents torque source 340 from being over driven while the vehicle is driven at higher speeds through power delivered by gear 252.

Vehicle transmission 720 operates under the control of controller 270. As described above with respect to harvester 200, controller 270 comprises processing unit or processor 272 and a non-transitory computer-readable medium 274. Processor 272 outputs control signals to torque sources 340 and 350 in accordance with instructions provided by memory 274. Memory 274 comprises logic, programming or code embodying instructions said direct the processor 272. Instructions provided by memory 274 may direct processor 272 to output control signals adjusting the degree of speed and/or torque provided by torque sources 340 and 350. For example, in implementations where torque sources 340, 350 comprise electric motors, such control signals may adjust speed and/or torque delivered by electric motors. In implementations where torque sources 340 and 350 comprise hydraulic motors, such control signals may adjust speed and/or torque delivered by the hydraulic motors. In some implementations, the control signals may adjust the output of a hydraulic pump and/or various valves that control the supply of hydraulic fluid to the hydraulic motors serving as torque sources 340, 350. Such control signals may be further based upon operator commands controlling the speed at which harvester 700 is traversed across a field and/or the speed and torque at which motive members 706 are to be driven. Such control signals may also be based upon system fault conditions and/or incoming signals from other vehicle controllers during specific machine operating modes.

In one implementation, torque sources 340, 350 supply similar levels of power to gears 42 and 52. For example, in one implementation in which torque sources 340, 350 comprise hydraulic motors, hydraulic motors are plumbed in a parallel hydraulic arrangement. Gears 42 and 52 are differently sized thus to provide different torque to speed ratios to the drive gear 330. In one implementation, gear 42 may have a root diameter of between 120 mm and 140 mm while gear 52 may have a root diameter of between 200 mm and 220 mm. In one implementation, the diameter of gear 52 is sized 80%-100% larger than the diameter of gear 42, wherein gears 42 and 52 collectively allow for a transmission of a corner power of up to 2005 kW while also providing the corresponding, discrete operating points of maximum transmission output torque and maximum transmission output speed with uninterrupted transfer of torque and speed throughout this entire operating range. For purposes of this disclosure, "corner power" may be determined by multiplying an overall maximum output torque of the transmission by the overall maximum output speed of the transmission, wherein the overall maximum output torque and the overall maximum output speed are distinct operating points for the transmission. This wide range of torque to speed ratios provides high ground drive torque in circumstances where high degrees of torque at a work speeds are required, such as when the vehicle is propelling up a steep gradient or hill at a work speed or is encountering resistance such as when harvesting in or propelling through soils of low cone index. This wide range of torque to speed ratios also provides a high vehicle speed at a reduced ground drive torque in circumstances where the vehicle is traveling at high ground speeds, such as when the agricultural vehicle is transporting to or from a field on a highway or other road. The described transmission arrangement and associated wide range of torque to speed ratios allow seamless or uninterrupted transitions between operating states of high ground drive torques at work speeds and operating states of low ground drive torques at high ground speeds.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle transmission comprising:
   a differential comprising:
      output shafts extending along a first axis;
      a carrier rotatable about the first axis; and
      at least one torque receiver fixed to the carrier;
   a first torque input having a first torque transmitter directly connected to the at least one torque receiver of the carrier and rotatable about a second axis parallel to the first axis; and
   a second torque input having a second torque transmitter directly connected to the at least one torque receiver of the carrier and rotatable about a third axis parallel to the first axis.

2. The vehicle transmission of claim 1, wherein the at least one torque receiver comprises a torque receiver selected from a group of torque receivers consisting of a gear, a sprocket and a pulley.

3. The vehicle transmission of claim 1, wherein the first torque input comprises a motor.

4. The vehicle transmission of claim 3, wherein the motor is a hydraulic motor.

5. The vehicle transmission of claim 3, wherein the motor is an electric motor.

6. The vehicle transmission of claim 3, wherein the motor has an output shaft directly supporting the first torque transmitter.

7. The vehicle transmission of claim 3, wherein the second torque input comprises a second motor.

8. The vehicle transmission of claim 7, further comprising a clutch configured to selectively couple the second motor to the second torque transmitter.

9. The vehicle transmission of claim 8, wherein the clutch has an input side directly connected to an output shaft of the second motor and an output side directly connected to the second torque transmitter.

10. The vehicle transmission of claim 8 further comprising a second clutch operably coupled between the second motor and the second torque transmitter.

11. The vehicle transmission of claim 7, wherein the second motor has output shaft directly supporting the second torque transmitter.

12. The vehicle transmission of claim 1, wherein the at least one torque receiver of the carrier comprises a single carrier torque receiver.

13. The vehicle transmission of claim 1, wherein the at least one torque receiver of the carrier comprises a first carrier torque receiver and a second carrier torque receiver.

14. The vehicle transmission of claim 13, wherein the first carrier torque receiver and the second carrier torque receiver are differently sized.

15. The vehicle transmission of claim 1, wherein the first torque input and the second torque input are configured to collectively transmit a corner power of up to 2005 kW while also providing the corresponding, discrete operating points of maximum transmission output torque and maximum transmission output speed with uninterrupted transfer of torque and speed throughout an entire operating range.

16. The vehicle transmission of claim 1, wherein the vehicle transmission provides a continuous and uninterrupted transfer of torque and speed from operating conditions of maximum torque to speed ratio to operating conditions of minimum torque to speed ratio.

17. A harvester comprising:
   a frame;
   a crop threshing mechanism carried by the frame;
   ground engaging harvester propelling members; and
   a vehicle transmission for supplying power from the power source to the ground engaging harvester propelling members, the vehicle transmission comprising:
      a differential comprising a carrier and at least one gear fixed to the carrier;
      a first torque input having a first gear directly meshing with the at least one gear of the carrier; and
      a second torque input having a second gear directly meshing with the at least one gear fixed to the carrier, wherein the second torque input comprises a second motor, the vehicle transmission further comprising a clutch to selectively couple the second motor to the second gear.

18. The harvester of claim bracket 17, wherein the first torque input comprises a motor.

19. The harvester of claim 17, wherein the motor has an output shaft directly supporting the first gear.

20. A vehicle transmission comprising:
   a differential comprising:
   a carrier;
   and at least one torque receiver fixed to the carrier;
   a first torque input having a first torque transmitter directly connected to the at least one torque receiver of the carrier, wherein the first torque input comprises a motor;
   a second torque input having a second torque transmitter directly connected to the at least one torque receiver of the carrier, wherein the second torque input comprises a second motor;
   a clutch configured to selectively couple the second motor to the second torque transmitter; and
   a second clutch operably coupled between the second motor and the second torque transmitter.

21. The vehicle transmission of claim 1, wherein the first torque transmitter and the second torque transmitter each comprise a single parallel axis gear set with respect to the at least one torque receiver of the carrier.

* * * * *